United States Patent
Huchthausen (10) Patent No.: US 8,291,600 B1
(45) Date of Patent: Oct. 23, 2012

(54) TASTING UTENSIL

(76) Inventor: Timothy Huchthausen, Hampton, CT (US)

( * ) Notice: Subject to any disclaimer, the term of this patent is extended or adjusted under 35 U.S.C. 154(b) by 278 days.

(21) Appl. No.: 12/615,816

(22) Filed: Nov. 10, 2009

Related U.S. Application Data (60) Provisional application No. 61/117,305, filed on Nov. 24, 2008.

(51) Int. Cl.
*A47J 43/28* (2006.01)

(52) U.S. Cl. ............... 30/326; 30/324; D7/653

(58) Field of Classification Search ........... 30/324, 30/325, 326, 328; D7/653, 662
See application file for complete search history.

(56) References Cited

U.S. PATENT DOCUMENTS

| | | | | |
|---|---|---|---|---|
| 107,419 A | * | 9/1870 | Spencer | 30/123.3 |
| 135,141 A | * | 1/1873 | Mitcheson | 30/326 |
| 244,551 A | * | 7/1881 | Clayton | 30/326 |
| 353,055 A | * | 11/1886 | Dorr | 73/427 |
| D24,197 S | * | 4/1895 | Nye | D7/653 |
| D25,168 S | * | 2/1896 | Garner | D7/653 |
| 620,792 A | * | 3/1899 | Middleton | 30/141 |
| 680,648 A | * | 8/1901 | Crandall | 30/326 |
| 753,728 A | * | 3/1904 | Nyce | 30/326 |
| 829,652 A | * | 8/1906 | Johnson | 206/0.5 |
| 847,942 A | * | 3/1907 | Hohein | 30/326 |
| 1,002,094 A | * | 8/1911 | Theriault | 30/326 |
| 1,010,795 A | * | 12/1911 | Pfaff | 30/326 |
| 1,175,709 A | * | 3/1916 | Cole | 30/326 |
| 1,280,006 A | * | 9/1918 | Fitzgerald | 30/326 |
| D60,109 S | * | 12/1921 | Rosen | D7/667 |
| 1,474,443 A | * | 11/1923 | Rhyne | 30/326 |
| 1,601,613 A | * | 9/1926 | Fenyves | 99/323 |
| 1,648,123 A | * | 11/1927 | Hodgman | 30/326 |
| 2,249,551 A | * | 7/1941 | Zohe | 30/324 |
| 2,287,715 A | * | 6/1942 | Weens | 30/326 |
| 2,291,702 A | * | 8/1942 | Downes | 426/82 |
| D134,658 S | * | 12/1942 | Cole | D7/653 |
| D139,605 S | * | 12/1944 | Fuchs | D24/116 |
| 2,592,192 A | * | 4/1952 | Sanford | 30/326 |
| 2,640,263 A | * | 6/1953 | Dieterich | 30/326 |
| 2,691,877 A | * | 10/1954 | Frolich | 401/12 |
| 2,803,059 A | * | 8/1957 | Murdock et al. | 30/324 |
| 3,054,184 A | * | 9/1962 | Wyner et al. | 30/326 |
| 3,360,121 A | * | 12/1967 | Zoeller et al. | 206/216 |

(Continued)

FOREIGN PATENT DOCUMENTS

GB  2 136 272 A  *  9/1984

*Primary Examiner* — Hwei C Payer (74) *Attorney, Agent, or Firm* — UCONN IP Law Clinic; Robert Smith; Lily Neff (57) ABSTRACT

A multi-purpose tasting utensil comprises a handle, a bowl and a covering. The bowl is connected with a handle at its proximal extremity, and the covering extends at least partially over the bowl from the bowl's distal extremity toward its proximal extremity such as to form a protected pocket area for retention of food and/or drinks. In an alternate embodiment, the bowl has a secured part at its proximal extremity, and different handles of various lengths which can be connected to the bowl through the secured parts. In one embodiment, the method for fabricating the utensil comprises the steps of forming a bowl with a covering at its distal extremity, such that the covering extends at least partially over the bowl to form a protected pocket area for retention of food and/or drinks; and securing the bowl to a handle at the proximal extremity opposite of the partial covering.

16 Claims, 8 Drawing Sheets

U.S. PATENT DOCUMENTS

| | | | | |
|---|---|---|---|---|
| 3,662,463 | A * | 5/1972 | Ushkow et al. | 30/326 |
| 3,755,895 | A * | 9/1973 | Claasen | 30/326 |
| 3,911,578 | A * | 10/1975 | Ushkow et al. | 30/326 |
| 4,524,517 | A * | 6/1985 | Rupe | 30/324 |
| 4,823,419 | A | 4/1989 | Stimpson | |
| 4,825,551 | A * | 5/1989 | Sherblom | 30/326 |
| 5,791,053 | A * | 8/1998 | Koong | 30/142 |
| 5,890,223 | A * | 4/1999 | Klemmer | 30/326 |
| 6,408,521 | B1 | 6/2002 | Pye et al. | |
| 6,453,562 | B1 * | 9/2002 | Hakim | 30/324 |
| 6,463,662 | B1 * | 10/2002 | Coscia et al. | 30/141 |
| 2003/0189346 | A1 | 10/2003 | Leydens | |
| 2005/0229406 | A1 * | 10/2005 | Lai | 30/324 |
| 2008/0163498 | A1 * | 7/2008 | Masheah et al. | 30/326 |
| 2010/0011592 | A1 * | 1/2010 | Hougland | 30/324 |

* cited by examiner

TASTING UTENSIL

CROSS-REFERENCE TO RELATED APPLICATION

This application claims the benefit under 35 U.S.C. §119 (c), to U.S. Provisional Application No. 61/117,305, filed Nov. 24, 2008, titled Tasting Spoon.

FIELD OF THE INVENTION

This invention relates generally to a multi-purpose tasting utensil and more particularly to a tasting spoon which may be used to obtain and sample food or drinks especially from difficult to reach dishes, such as tall or narrow vessels.

BACKGROUND OF THE INVENTION

It is well known that cooks have a need to taste dishes such as soups, stews, purees, and sauces during food preparation to evaluate flavoring and/or texture of the product. Up until now, the majority of cooks have used regular spoons to remove samples, a method which has proven to be difficult and ineffective in certain circumstances. To retain food or drink samples consisting of liquid and/or solid particles, a regular spoon has to be nearly horizontal to the surface of the food material. This requirement makes it difficult to obtain an adequate sample from tall, narrow or deep vessels, particularly if the inside diameter of the vessel or its mouth is smaller than the length of the spoon handle. Additionally, it is difficult with a regular spoon to obtain a sample from anywhere near the bottom of the vessel.

Sometimes ladles are used to overcome this problem. A ladle can reach down into a tall or narrow vessel to obtain a sample of food from below its surface. However, the deep layer of food material retrieved in the ladle can stay uncomfortably hot for a long period of time. In addition, a ladle is not configured for tasting, because the deep bowl makes it difficult to sample directly. Sometimes cooks use a teaspoon in conjunction with a ladle to remove a smaller sample from the ladle. This method is inefficient and causes clutter and the need to wash more utensils. The prior art utensils are of various designs. But none of them adequately addresses or solves the above mentioned problems. Consequently, an improved utensil is desired that can help remove food or drink samples directly, particularly from tall, narrow, or deep vessels.

SUMMARY OF THE INVENTION

Thus, according to various aspects of the invention, a multi-purpose tasting utensil and a related fabrication method for the utensil is provided. The multi-purpose tasting utensil comprises a handle, a bowl and a covering. The bowl is connected with a handle at its proximate extremity, and the covering extends at least partially over the bowl from the bowl's distal extremity toward its proximate extremity such as to form a protected pocket area for retention of food and/or drinks. In an alternate embodiment, the bowl has a secured part at its proximate extremity, and different handles of various lengths which can be connected to the bowl through the secured parts. In one embodiment, the method for fabricating the utensil comprises the steps of forming a bowl with a covering at its distal extremity, such that the covering extends at least partially over the bowl to form a protected pocket area for retention of food and/or drinks; and securing the bowl to a handle at the proximal extremity opposite of the partial covering.

Additional features and advantages are realized through the techniques of the present invention. Other embodiments and aspects of the invention are described in detail herein and are considered a part of the claimed invention.

BRIEF DESCRIPTION OF THE DRAWINGS

The subject utensil which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
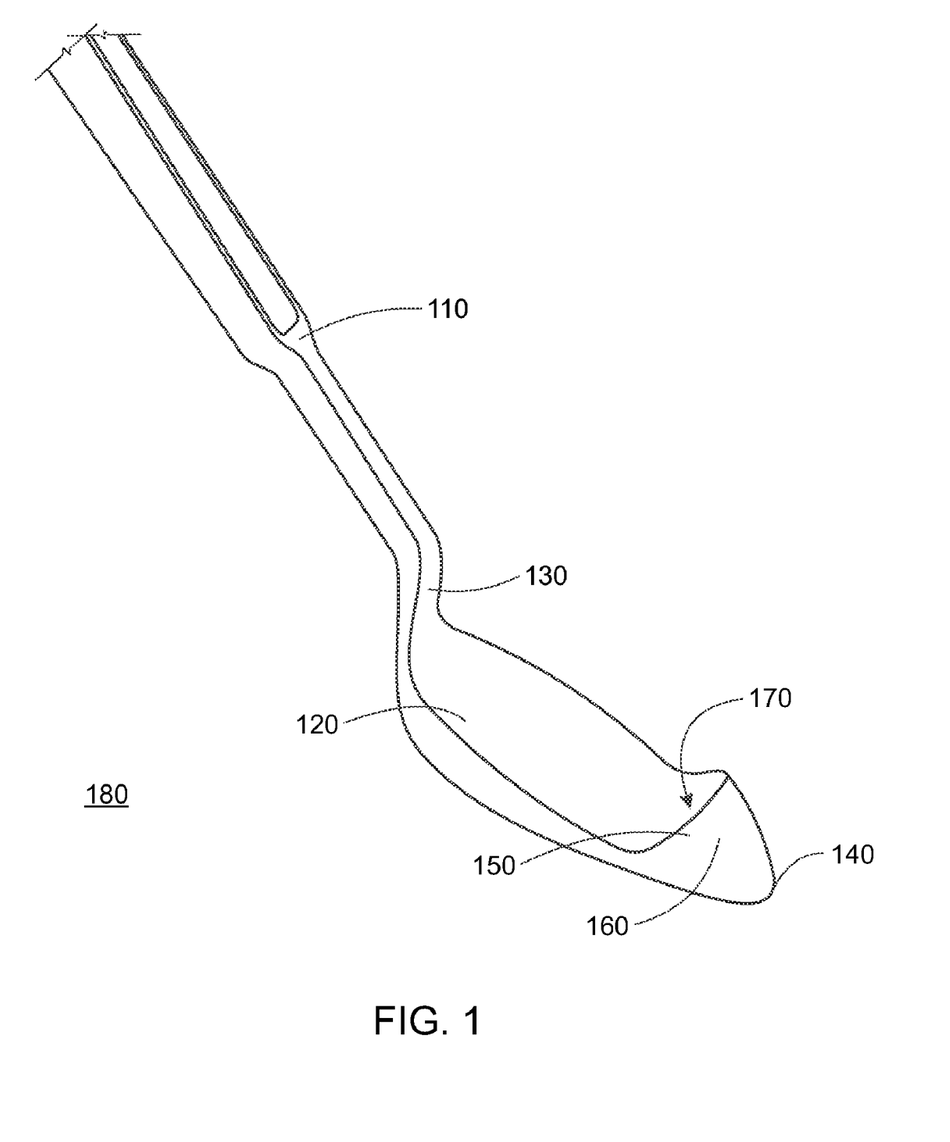
FIG. 1 is an oblique view illustration of the multi-purpose tasting utensil, as per one embodiment of the present invention.

FIG. 1 is an illustration of one embodiment of the present invention showing a multi-purpose tasting utensil. The utensil can be a spoon, a fork, a spoon/fork combination and other similar utensils as known to those skilled in the art. In a preferred embodiment as shown in the figure, the multi-purpose tasting utensil is a tasting spoon 180. The tasting spoon 180 comprises a handle 110, a bowl 120 and a covering 160. The shape of the bowl can be rounded, square, elongated or other shapes, but it is preferably oval shaped. As shown in FIG. 1, the bowl 120 has a proximal extremity 130 and a distal extremity 140. The bowl 120 is attached to the handle 110 at its proximal extremity 130. The covering 160 extends at least partially over the bowl 120 from the bowl's distal extremity 140 toward its proximal extremity 130 such as to form a protected pocket area 150, for retention of food and/or drinks. To achieve the best results in retaining food and/or drinks, the covering 160 has to be imperforate. The pocket 150 has an opening 170 facing the proximal extremity 130 of the bowl 120. As will be discussed later, the handle in one embodiment is secured to the bowl with fastening means as known to those skilled in the art. In an alternate embodiment, however the handle can be integral to the bowl.

Figure 2:
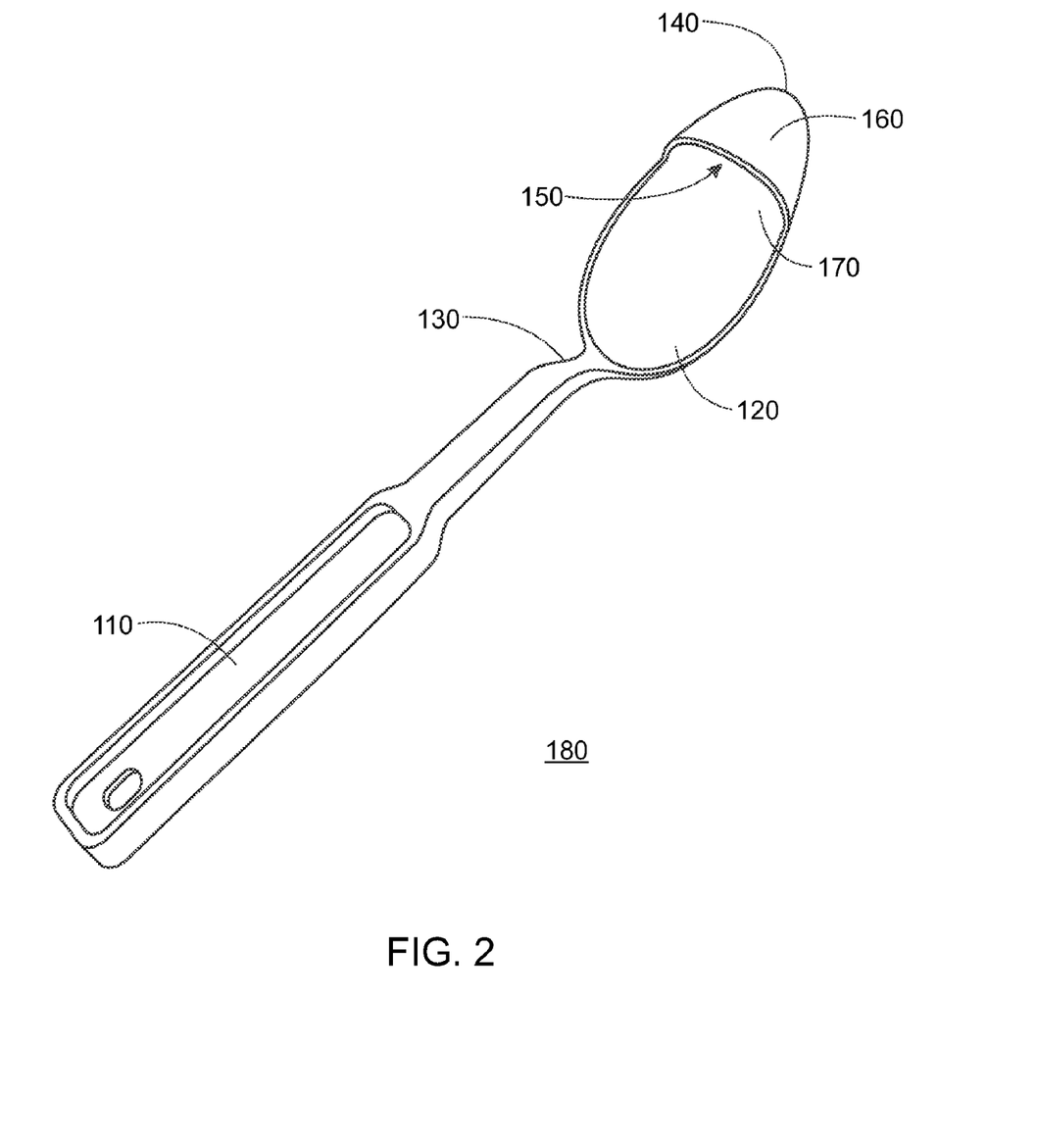
FIG. 2 is a top view illustration of the multi-purpose tasting utensil of FIG. 1.

FIG. 2 provides a top view illustration of the tasting spoon 180, as discussed in conjunction with the embodiment of FIG. 1. FIG. 2 provides a better view of pocket 150, disposed at the distal extremity 140 of the bowl 120, as formed by the bowl 120 and the covering 160. In addition, in one embodiment as shown, the pocket 150 further comprises an opening 170 facing the proximal extremity 130 of the bowl 120.

Figure 3:
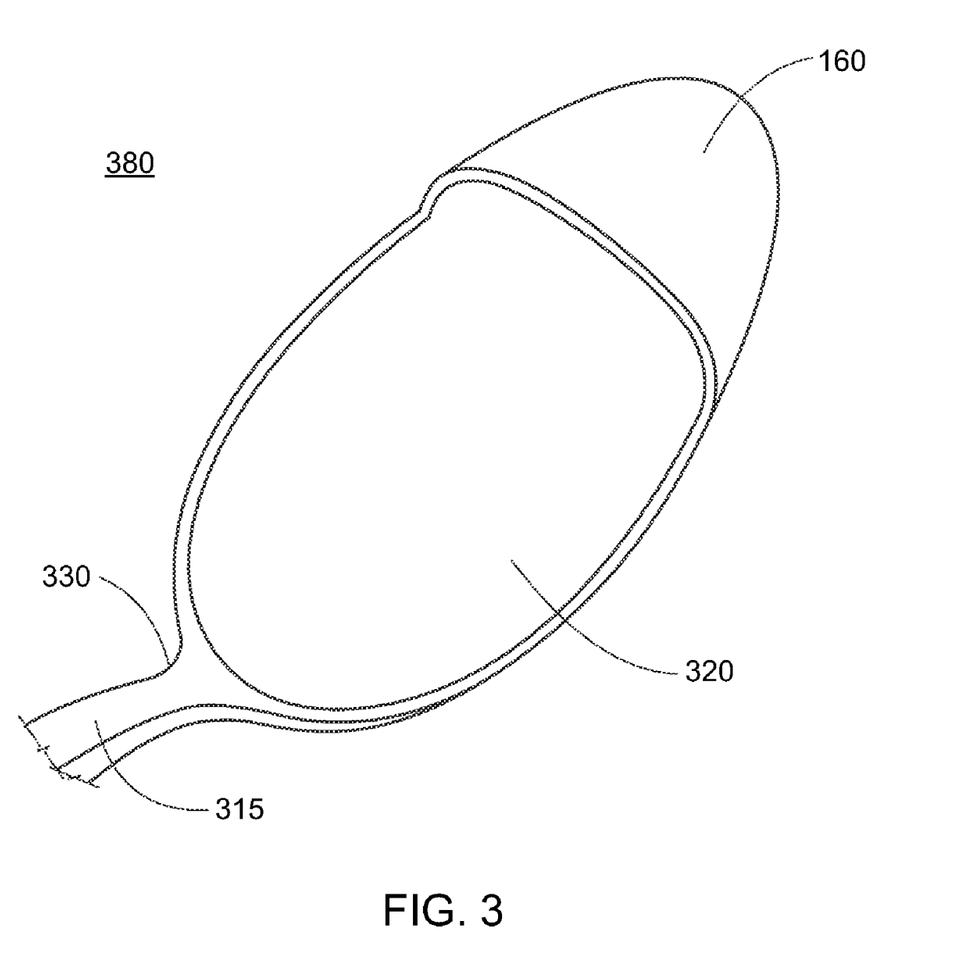
FIG. 3 is a top view illustration of the multi-purpose tasting utensil, as per an alternate embodiment of the invention.

FIG. 3 is an illustration of a tasting utensil as per an alternate embodiment of the invention. In this embodiment, the tasting spoon 380 comprises a bowl 320 and a covering 160. The bowl 320 has one or more secured parts 315 at its proximal extremity 330 which enables the bowl to be secured to different handles 410 of various lengths. Some examples of such handles and their different lengths are further provided in FIG. 4. As discussed earlier, the handles can be secured to the bowl using fastening means as known to those skilled in the art. These fastening means can include more permanent means such as those used during fabrication including but not limited to screws and bolts. In other embodiments, the fastening means may be attached by the user and can include clips or other similar means as known to those skilled in the art. An embodiment of the present invention wherein a handle 410 is secured to the bowl 120 using a fastening means 510 (a screw) is shown in FIG. 5.

Figure 6:
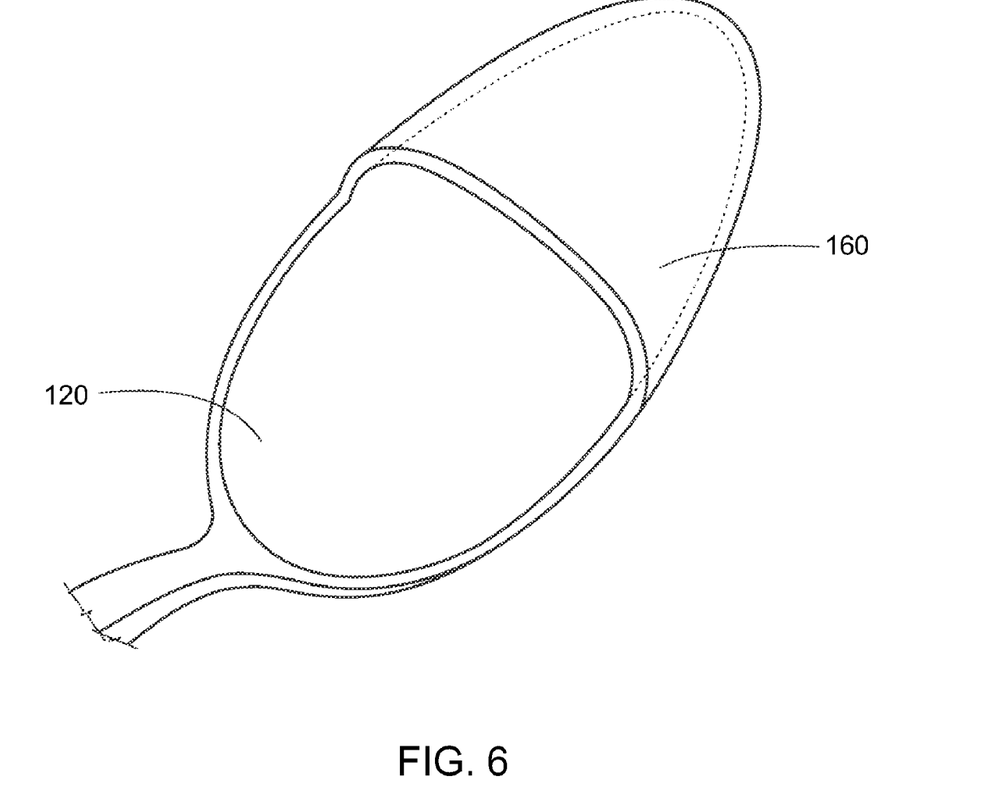
FIG. 6 is a top view illustration of the multi-purpose tasting utensil, as per one embodiment of the present invention, wherein the covering 160 is covering half of the bowl 120.
Figure 7:
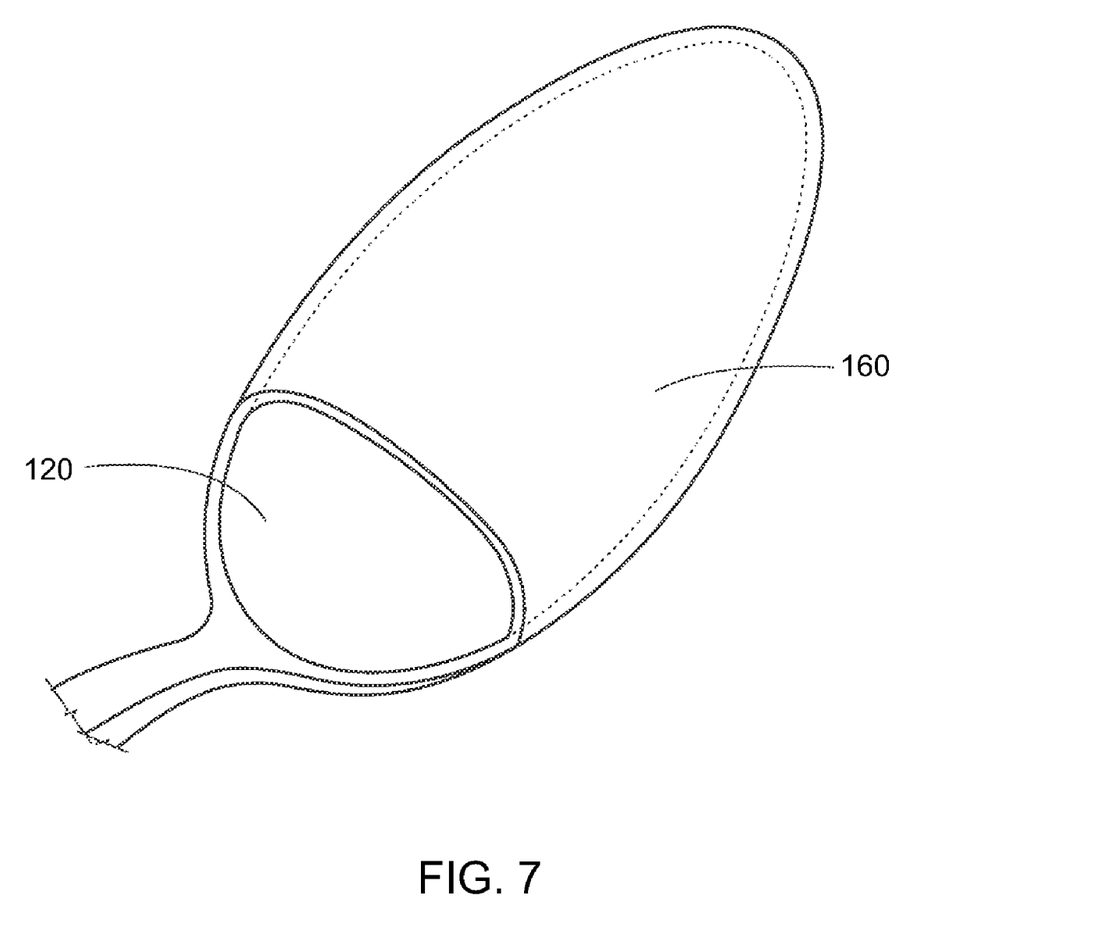
FIG. 7 is a top view illustration of the multi-purpose tasting utensil, as per one embodiment of the present invention, wherein the covering 160 is extending almost entirely over the bowl 120.

Referring back to FIGS. 1 and 3, it should be noted that the covering 160 may extend at least partially over the bowl 120. In other embodiments, the covering 160 also can extend substantially (for example, covering half of the bowl 120) or almost entirely over the bowl 120, as shown in FIGS. 6 and 7, respectively.

In addition, while the embodiments of FIGS. 1 and 3 reflect a design where the covering 160 is secured to the bowl substantially horizontally, it is conceivable to have alternate designs where such covering and the bowl can be secured to one another at an angle. In one embodiment, for example, the covering 160 can extend upwards and over the bowl. In another alternate embodiment, the covering 160 can extend from the distal extremity 140 to the proximal extremity 130 covering half of the tasting spoon 180.

Figure 4:
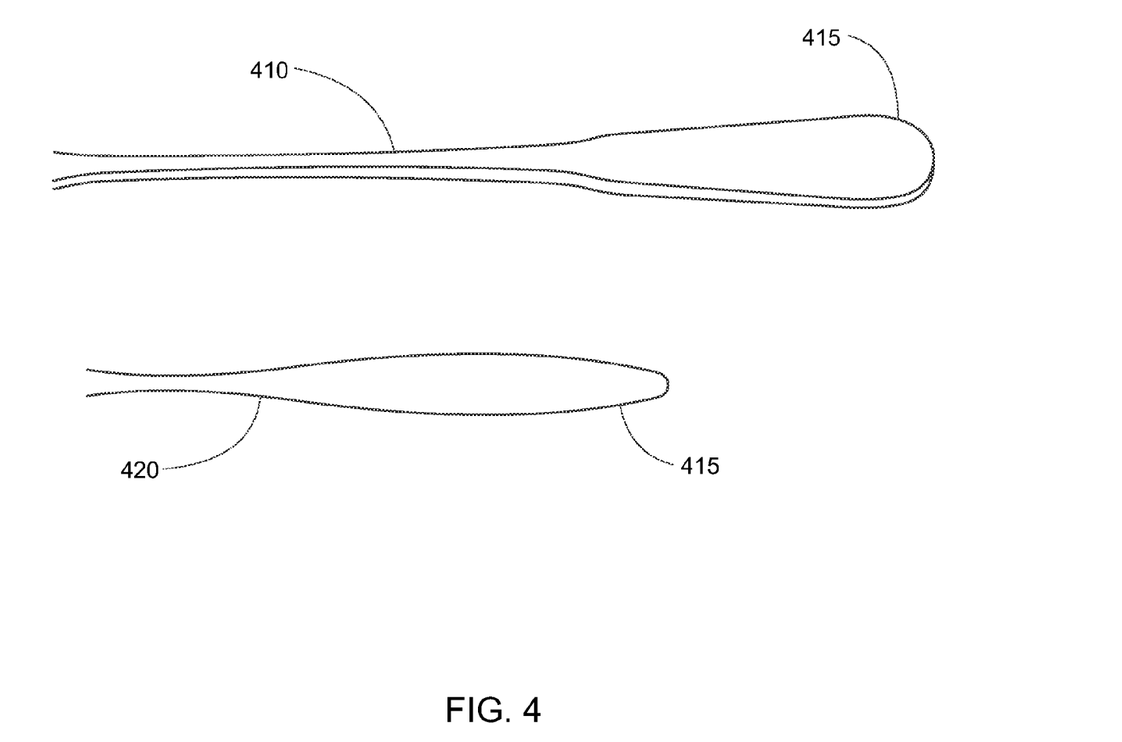
FIG. 4 is a sectional view illustration of the handles for a multi-purpose tasting utensil as per one embodiment of the present invention.
Figure 5:
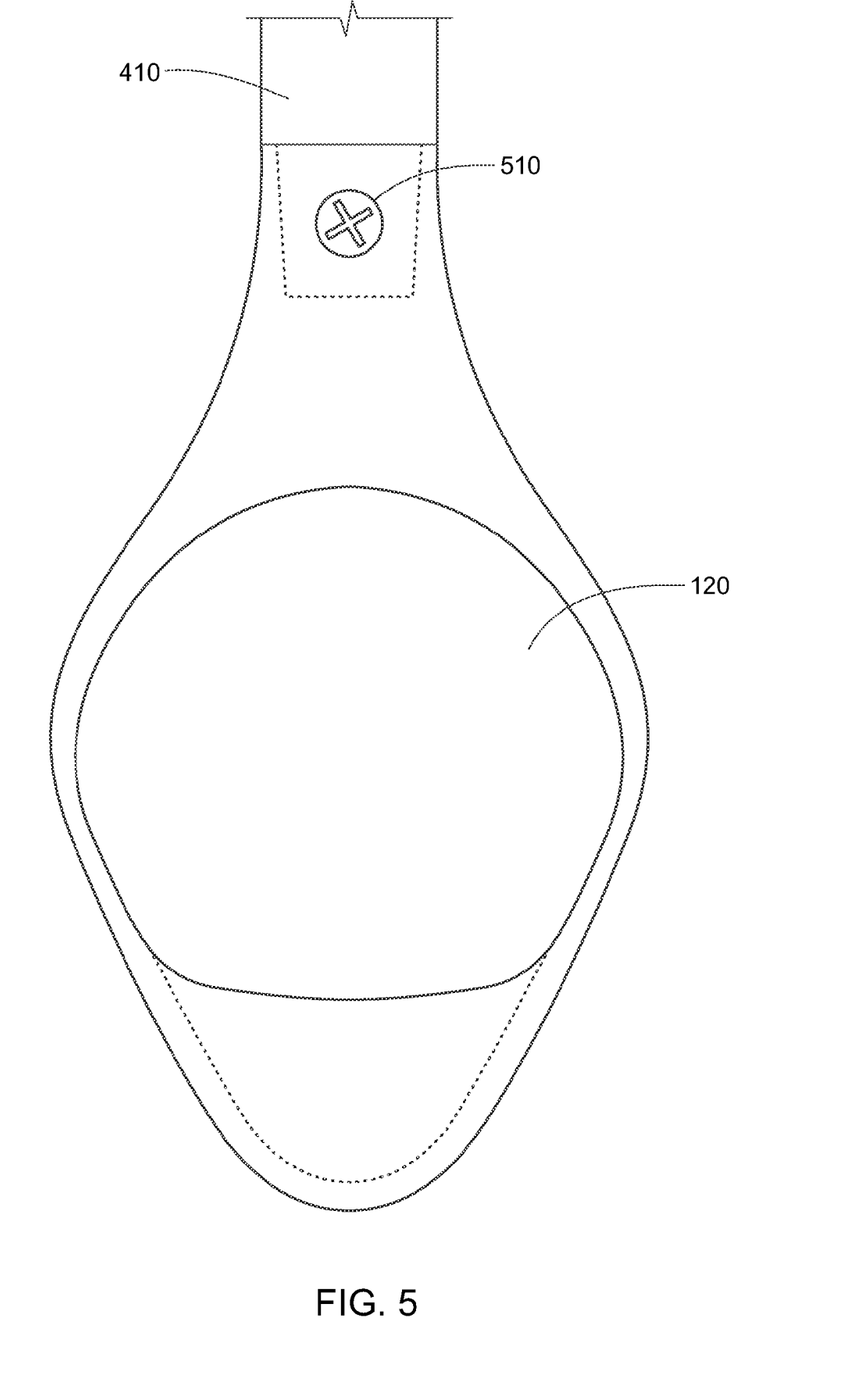
FIG. 5 is a top view illustration of the multi-purpose tasting utensil, as per one embodiment of the present invention, wherein a handle 410 is secured to the bowl 120 using a fastening means 510 (a screw).

As shown in FIG. 4, handle 410 represents a longer handle while handle 420 represents a shorter handle. Both handle 410 and handle 420 have secured parts 415 which enables the handle to be secured to the bowl 320. In alternate embodiments, the handle can be integral to the bowl and molded, for example, or it can be later fused together using a number of methods as known to those skilled in the art.

Figure 8:
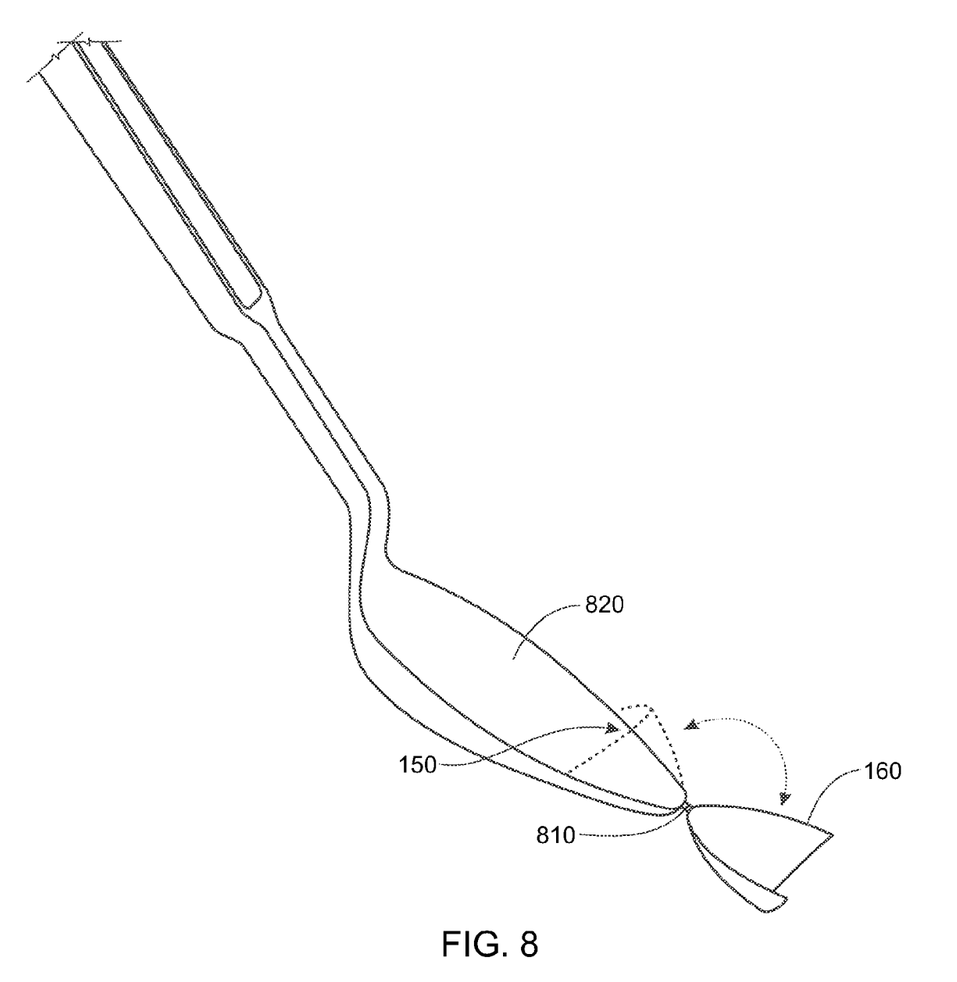
FIG. 8 is a top view illustration of the multi-purpose tasting utensil, as per one embodiment of the present invention, wherein the covering 160 is secured to the bowl 820 via a living hinge 810 in an open position.

The tasting utensil of the present invention can be fabricated in a variety of manners. In one embodiment, the covering 160 is fabricated as an integral part of the bowl as discussed earlier. In an alternate embodiment, as shown in FIG. 8, the covering 160 is secured to the bowl 820 via a living hinge 810, such that when the living hinge 810 is in a closed position, the covering 160 and the bowl 820 form the pocket 150, and the pocket area can be cleaned when the living hinge 810 is in an open position. In a preferred embodiment, the covering is pivotally attached to the bowl through the living hinge and may be partially or completely detached from the bowl to enable better cleaning. In another alternate embodiment, the tasting spoon 380 can be fabricated by making the bowl 320 with a covering 160 which extends at least partially over the bowl 320 to form a protected pocket area between them for retention of food and/or drinks. The handle can then be fabricated separately. In such a case a plurality of handles of different lengths, as discussed in conjunction with FIG. 4, can then be selectively secured to the bowl using fastening means such as those known to those skilled in the art. Alternatively, the bowl and handle are fabricated as one integral unit and later secured to the covering such as to form the pocket. It is also possible to fabricate the bowl, the handle and the covering together during the manufacturing process.

Similarly, the tasting utensil of the present invention may be made out of a number of materials suitable for cooking and tasting as known by those skilled in the art. In a preferred embodiment, the tasting utensil is fabricated out of metal, metal compounds, plastic or silicone by forming techniques well known in the art.

While the invention has been described in accordance with certain preferred embodiments thereof, those skilled in the art will understand the many modifications and enhancements which can be made thereto without departing from the true scope and spirit of the invention, which is limited only by the claims appended below.

What is claimed is:

1. A multi-purpose tasting utensil comprising:
   a handle;
   a bowl having a proximal extremity and a distal extremity; said bowl attached to said handle at its proximal extremity; and
   a single imperforate covering extending at least partially over said bowl from said distal extremity towards said proximal extremity, such that said covering and said bowl form a protected pocket area between them for retention of food and/or liquids; said protected pocket area having an opening facing said proximal extremity of said bowl; said covering being secured to said bowl at said distal extremity via a living hinge to form a closure at the distal extremity of said bowl, and said bowl being oval shaped.

2. The multi-purpose tasting utensil of claim 1, wherein said covering is raised from said bowl so that said protected pocket area has a plurality of sides that extend from sides of said bowl upwards but remain substantially flat on a top surface.

3. The multi-purpose tasting utensil of claim 2, wherein said covering extends almost entirely over said bowl from said distal extremity towards said proximal extremity.

4. The multi-purpose tasting utensil of claim 2, wherein said covering extends substantially over said bowl from said distal extremity towards said proximal extremity.

5. The multi-purpose tasting utensil of claim 4, wherein said covering is fabricated as a partially detachable part of said bowl.

6. The multi-purpose tasting utensil of claim 5, wherein said bowl is made substantially from plastic.

7. The multi-purpose tasting utensil of claim 4, wherein said bowl is made substantially from silicone.

8. The multi-purpose tasting utensil of claim 2, wherein said covering is fabricated as an integral part of said bowl.

9. The multi-purpose tasting utensil of claim 8, wherein said bowl is made substantially from metal and/or metal compounds.

10. A multi-purpose tasting utensil, comprising:
    a bowl having a proximal extremity and a distal extremity; said bowl securable to a handle of a first length at its proximal extremity; and
    a single imperforate covering extending at least partial over said bowl from said distal extremity towards said proximal extremity, such that said covering and said bowl form a protected pocket area between them for storing food and/or liquids; said protected pocket area closed at the distal extremity of said bowl and having an opening facing said proximal extremity of said bowl;

and said covering is raised from said bowl so that said protected pocket area has a plurality of sides raising to a substantially flat top.

11. The multi-purpose tasting utensil of claim 10, wherein said bowl can be secured to different handles of various lengths.

12. The multi-purpose tasting utensil of claim 11, wherein said bowl is secured to said handle using fastening means and said bowl is made substantially from metal and/or metal compounds.

13. The multi-purpose tasting utensil of claim 11, wherein said covering extends substantially over said bowl from said distal extremity toward said proximal extremity and said bowl is made substantially from plastic.

14. The multi-purpose tasting utensil of claim 13, wherein said covering extends almost entirely over said bowl from said distal extremity toward said proximal extremity.

15. A method of fabricating a multipurpose tasting utensil, comprising the steps of:

forming a bowl having a proximal extremity and a distal extremity with a single imperforate covering at said distal extremity such that said covering extends at least partially over said bowl to form a protected pocket area for storing food and/or drinks; said protected pocket area closed at the distal extremity of said bowl and having an opening facing said proximal extremity of said bowl; said covering is raised from said bowl so that said protected pocket area has a plurality of sides raising to a substantially flat top and securing said bowl to a handle of a first length at said proximate extremity; said handle being detachable from said bowl.

16. The method of claim 15, wherein the method further comprises the step of providing a handle of a second length so that said bowl can be secured to the handle of a second length instead of said handle of a first length.

* * * * *